United States Patent [19]

Hunter et al.

[11] Patent Number: 4,673,298

[45] Date of Patent: Jun. 16, 1987

[54] TIRE TEMPERATURE MEASUREMENT APPARATUS

[75] Inventors: Ian Hunter, Essex; Graham Mason, Kent; Michael Scorer, Hertfordshire, all of England

[73] Assignee: GEC Avionics Limited, England

[21] Appl. No.: 627,426

[22] Filed: Jul. 3, 1984

[30] Foreign Application Priority Data

Jul. 11, 1983 [GB] United Kingdom ................ 8318699

[51] Int. Cl.$^4$ ............................................. G01J 5/00
[52] U.S. Cl. ...................................... 374/122; 374/131
[58] Field of Search .............. 374/122, 124, 130, 131, 374/133, 153, 144, 137, 120, 121, 126, 127; 340/578, 584, 600; 350/276 R, 276 SL; 73/146

[56] References Cited

U.S. PATENT DOCUMENTS

| | | | |
|---|---|---|---|
| 3,204,240 | 8/1965 | McKay et al. | 343/100 |
| 3,325,644 | 6/1967 | Frye et al. | 374/122 |
| 3,549,986 | 12/1970 | Prine | 324/58.5 |
| 3,564,420 | 2/1971 | Webb | 374/122 |
| 3,854,336 | 12/1974 | Bibby | 374/122 |
| 4,106,340 | 8/1978 | Hamid | 374/122 |
| 4,107,680 | 8/1978 | Kaplan | 343/717 |
| 4,150,567 | 4/1979 | Prevorsek et al. | 73/146 |
| 4,235,107 | 12/1980 | Lüdeke et al. | 374/122 |
| 4,275,741 | 6/1981 | Eurich | 374/122 |
| 4,499,470 | 2/1985 | Stacey | 374/122 |
| 4,568,199 | 2/1986 | Schmidt | 374/122 |
| 4,583,869 | 4/1986 | Chive et al. | 374/122 |

FOREIGN PATENT DOCUMENTS 1166887 10/1969 United Kingdom .
1596766 8/1981 United Kingdom ......... 350/276 SL

OTHER PUBLICATIONS

*The Review of Scientific Instruments*, vol. 17, No. 7, Jul. 1946, R. H. Dicke; "The Measurement of Thermal Radiation at Microwave Frequencies", pp. 268–275.
*Temperature: Its Measurement and Control in Science and Industry*, vol. 4, 1972, F. T. Barath; "Microwave Radiometric Systems", pp. 2271–2277.
*Physics*, Hausman, E. & Slack, E., 1935, pp. 699–701.
"Thermal Noise Emission of a Lossy Material for a TEM Propagation", Electronic Letters, 28 May, 1981, pp. 376–366.
"Microwave Thermography for Biomedical Applications", Workshop on Medical Applications of Microwave 12th European Microwave Conference, Helsinki, Sep. 1982.
"Thermography at Millimeter Wavelengths", Proc. IEEE, Oct. 1974.
"Millimeter Wave Thermograph as Subcutaneous Indicator of Joint Inflammation", European Microwave Conference, Sep. 1977.

*Primary Examiner*—Allan N. Shoap
*Assistant Examiner*—Patrick R. Scanlon
*Attorney, Agent, or Firm*—Kirschstein, Kirschstein, Ottinger & Israel

[57] ABSTRACT

A tire temperature measurement apparatus comprising a microwave receiver (9 or 11) sensitive to electromagnetic radiation in a waveband in the frequency spectrum 10 to 100 GHz and a directional antenna (5 or 7) coupled to the receiver input and responsive to radiation from a predetermined surface area only of the tire (1 or 3).

10 Claims, 3 Drawing Figures

TIRE TEMPERATURE MEASUREMENT APPARATUS

BACKGROUND OF THE INVENTION

1. Field of the Invention

This invention relates to apparatus for measuring tire temperatures.

2. Description of Related Art

Large aircraft generate a great deal of heat in their tires during landing, taxiing and taking off. This is due to flexure of the rubber and conduction of heat from the brakes. Because rubber is a poor thermal conductor the heat may build up more rapidly than it can be dissipated, especially on aircraft executing repeated short flights, abnormally long taxi distances or aborted take-offs. If the pilot is unaware of the resultant ever increasing temperature it may cause a hazardous tire burst. To prevent this it is frequently necessary to apply an obligatory safe cooling period between flights, and this can become the limiting factor in the turnround time of the aircraft.

The actual tire temperature depends on many factors such, for example, as number of previous flights
atmospheric temperature
aircraft weight
taxi distance
use of brakes A safe obligatory cooling period cannot generally take all these factors into account and is therefore often unnecessarily long.

SUMMARY OF THE INVENTION

It is an object of the present invention to provide an apparatus capable of providing a measure of the temperature of a tire, thereby avoiding the need for an obligatory safe cooling period.

According to the invention an apparatus for deriving an output representative of the temperature of a tire comprises: a tire supporting structure; a tire as aforesaid rotatively mounted on the structure; a microwave receiver sensitive to electromagnetic radiation in a waveband in the frequency spectrum 10 to 100 GHz; and a directional antenna having its output coupled to the receiver input and whose aperture and orientation are such that the antenna is responsive to radiation in the aforesaid waveband emanating substantially from deep within the tire and leaving the tire through the surface of the tire.

It will be appreciated that during wheel motion the antenna is responsive to radiation leaving the tire through a continuous band around the tire surface; when the wheel is stationary the antenna is responsive to radiation leaving the tire through the stationary segment of the said band within the aperture of the antenna.

Normally the apparatus will further include indicator means responsive to the output of the receiver to provide a visual or audible indication of the tire temperature.

To reduce the effect of reflection of radiation at the tire surface the antenna may be oriented to the normal to the tire surface at the Brewster angle of the material of the tire.

Alternatively, a shield may be provided to prevent microwave energy which would otherwise be reflected at the tire surface to the antenna, from impinging on the tire surface.

An isolator between the antenna and the receiver to prevent radiation from the antenna of microwave energy originating in the receiver may also be provided.

It will be appreciated that an apparatus according to the invention finds application for purposes other than avoiding unnecessarily long obligatory safe cooling periods as described above. For example, since many aircraft and road vehicle wheel-oriented faults give rise to an increase in the tire temperatures, an apparatus according to the invention can be used to give advance warning of these faults before an accident occurs. Examples of such faults are faults in tire manufacture, loss of tire pressure, overloading due to suspension fault or loss of an adjacent tire, brakes sticking, and damage by foreign objects.

Furthermore apparatus according to the invention may be a valuable test instrument for the purposes of tire development and manufacture for the following reasons:

(a) Remote measurements can be made without stopping the wheel to insert sensing elements. No slip rings are required.

(b) The apparatus is a non-intrusive device unlike embedded temperature sensing devices with electrical connections which distort the stress and heat distributions that they are intended to measure.

(c) The apparatus has a fast response time of the order 50 milli-secs.

It is pointed out that apparatus using infra-red radiation to derive a measure of tire temperature has previously been proposed, but that such apparatus only provides a measure of the temperature at the surface of a tire which bears little relation to internal temperature.

BRIEF DESCRIPTION OF THE DRAWINGS

One apparatus in accordance with the invention will now be described by way of example with reference to the accompanying drawings in which.

DETAILED DESCRIPTION OF THE PREFERRED EMBODIMENTS

Figure 1:
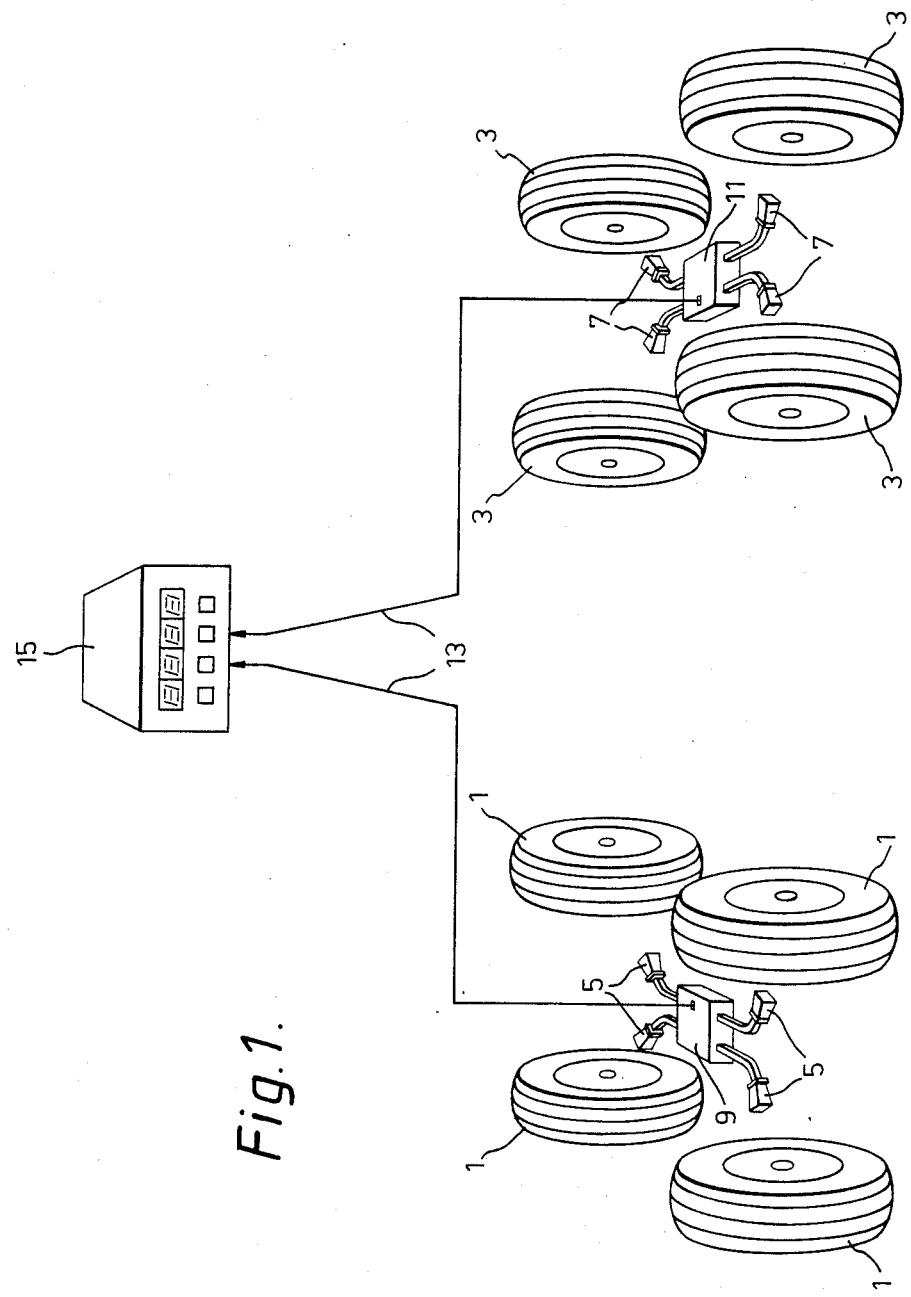
FIG. 1 is a schematic diagram showing the apparatus mounted on an aircraft undercarriage.

Referring to FIG. 1, the apparatus is arranged to provide a measure of the temperature of the tires on each of two four-wheel undercarriage bogies of a large aircraft, the four tires 1 or 3 only of each bogie being shown in the drawing for simplicity.

The apparatus includes four small directional horn antennae 5 or 7 mounted on each bogie, each antennae typically having an aperture of the order of 2 cm × 4 cm and being positioned about 5 cm from the surface of the shoulder of a respective one of the tires so that the rubber surface fills the field of view of the antenna.

The apparatus further includes two microwave receivers 9 and 11, one on each bogie, each receiver being alternatively connectable to the four attenae on the bogie by a suitable switching arrangement, for example, an electronically controlled semiconductor switching arrangement.

The outputs of the two receivers 9 and 11 are supplied by way of a time-shared data transmission system 13 to a temperature indicator unit 15 in the aircraft cockpit which utilises the outputs of the receivers to provide a visual and/or audible indication of the temperature of any selected one of the tires 1 and 3.

The receivers are tuned to a frequency in the band 10 to 100 GHz, preferably to a frequency in Q-band i.e. in the range from 36 to 46 GHz.

These wavelengths are much longer than the infrared wavelengths at which maximum radiation is emitted according to Planck's Law. Although the receiver sensitivity must be correspondingly better there is an advantage that the radiation amplitude in the microwave range is proportional to the absolute temperature rather than to $T^5$ in the infra-red.

Furthermore at these wavelengths rubber is moderately transparent to radiation so that the antennae receive radiation originating from deep within the tires. At the same time the rubber is not so transparent to radiation at these wavelengths that radiation from the background beyond a tire can penetrate right through the tire and distort measurement. The temperature measured is thus the weighted mean of the temperatures in the volume of rubber defined by the aperture of the antenna and extending from the surface inwards to some effective depth which depends on the frequency to which the receivers are tuned, the weighting factor reducing exponentially with depth. This is not necessarily equivalent to a point temperature as measured by a conventional instrument such as a thermocouple but calculations and comparative experiments show that an accuracy of the order of $\pm 10°$ C. is obtainable.

As there is a particular temperature above which irreversible chemical changes occur in the rubber, the critical factor from the safety point of view is the highest localised temperature existing in the tire. The peak temperature can be related to the receiver output if the shape of the profile of temperature vs depth is known, and the appropriate calibration correction factor is applied within the indicator unit 15.

Experiments have shown this profile to be fairly uniform on a fully developed tire except for areas very close to the surface.

However, it is desirable to take into account variations in the temperature profile which may occur. While taxiing most heat is generated near the centre of the thickness of a tire so that a temperature profile with a high central peak results. When the tire is left to cool heat soaks out towards the surface giving a flatter profile. The temperature near the outer surface is also sensitive to local air temperature and velocity.

Figure 2:
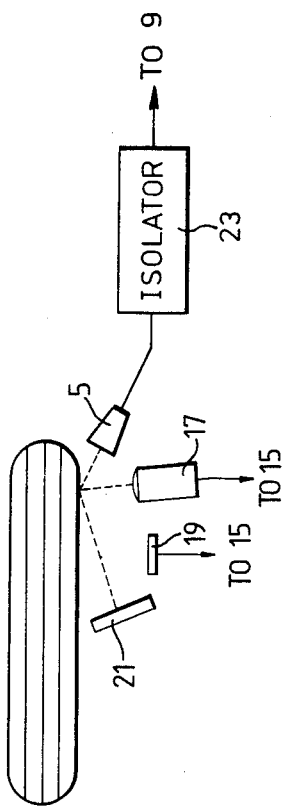
FIG. 2 illustrates various modifications of the apparatus of FIG. 1.

The temperature profile is suitably estimated by a small computer incorporated in the indicator unit 15 and arranged to compute heat flow through the thickness of the tire. To improve accuracy of the estimate of the part of the profile near the tire surface account may be taken of the abovementioned variable surface cooling effect. As illustrated in FIG. 2, this can be done by providing the computer with an input representative of tire surface temperature, e.g. by means of a conventional infra-red temperature sensor 17, or with an input representative of the cooling effect of local air, e.g. by means of a heated anemometer plate 19 adjacent the tire surface.

In some applications of an apparatus according to the invention, e.g. for the purposes of tire development, it is desirable to detect quite small hot-spots which do not have a predictable temperature profile against depth. The entire profile can be then determined by the use of one or more receivers covering different ranges of wavelength, but this is not necessary for an aircraft or other vehicle installation.

The amplitude of the radiation reaching the antennae from the tires may be diminished by reflection within the tires at their interface with the surrounding air. In addition, unwanted radiation from the environment may reach the antennae after external reflection at the interface.

Both these effects depend on the reflection coefficient at the tire/air interface and may therefore be minimised by orienting the antennae at the Brewster angle to the normal to the tire surface. By this means the effect of variations in the reflection coefficient, due for example to surface contamination, e.g. by rainwater, is also minimised.

If it is not convenient to orient the antennae at the Brewster angle, e.g. due to mechanical considerations or to the fact that the projected area of the tire surface in view of the antennae is undesirably large, shields 21 may be used to prevent radiation from the environment which would otherwise be reflected to the antenna 5 or 7 from impinging on the tyres, as illustrated in FIG. 2. Such shields are either made of or coated with microwave emitting substance and provided with a temperature sensor so that the radiation reaching the attenae by reflection from the shields is of known amplitude and can be compensated for.

Where the antennae are oriented near to the normal to the tire surfaces, the reflected radiation originates mainly from the antennae themselves. In this case, as illustrated in FIG. 2, an isolator 23, i.e. a one-way device which allows microwave energy to travel only from an antenna to the associated receiver may be provided between each antenna and its associated receiver. This prevents radiation by the antennae of microwave energy originating in the receivers.

It is pointed out that since the microwave reflection coefficient of clean metal surfaces is almost unity, very hot metal parts such as brake components and wheel rims, radiate a negligible amount and act primarily as reflectors. This is important since the presence of such hot items near the antennae might otherwise corrupt the temperature measurements obtained.

Figure 3:
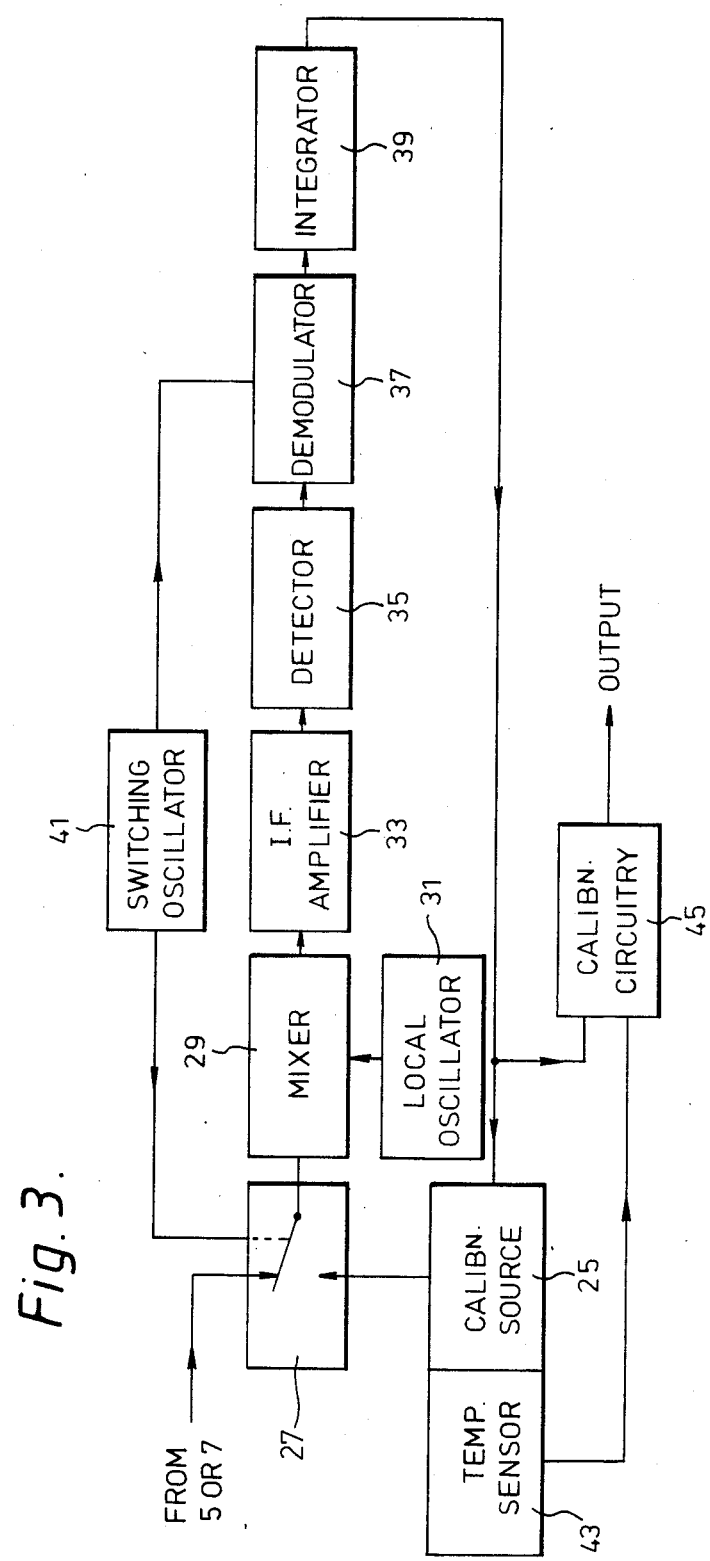
FIG. 3 is a block schematic diagram of a receiver forming part of the apparatus.

FIG. 3 illustrates one suitable arrangement for the receivers 9 and 11.

In this arrangement the signals from the selected antenna 5 or 7 and a calibration microwave energy source 25 are alternately applied via a microwave switch 27, e.g. a Dicke switch, to a conventional microwave superheterodyne receiver arrangement comprising a frequency mixer 29, a local oscillator 31, an IF amplifier 33 and a detector 35.

The output of the detector 35 is applied via a phase sensitive demodulator 37 to an integrator 39 whose output is utilised to control the output of the calibration source 25, the demodulator 37 being operated in synchronism with the switch 27 by a switching oscillator 41.

The calibration source 25 is associated with a temperature sensor 43 which monitors the output of the source.

The outputs of the sensor 43 and the integrator 39 are utilised by circuitry 45 performing a calibration function to provide an output to the indicator unit 15.

The demodulator 37 provides an ouput to the integrator 39 representative of the magnitude and sense of the difference between the outputs of the antenna 5 or 7 and calibration source 25. The output of the integrator 39 and hence the output of the source 25 varies until the output of the antenna 5 or 7 and source 25 are equal and the output of the demodulator 37 is zero. In this way the effect of variation of the gain of the receiver is eliminated.

The calibration source 25 suitably comprises a piece of microwave emitting material and an associated heater. Instead of a piece of microwave emitting material, a semiconductor device designed to emit microwave noise and having a known characteristic against applied voltage may be used. The temperature sensor 43 suitably comprises a thermocouple or a resistance thermometer.

It will be understood that whilst in the arrangement described by way of example with reference to FIG. 1 only one antenna 5 or 7 is associated with each tire 1 or 3, in other arrangements in accordance with the invention two or more antennae arranged to receive radiation from different predetermined surface areas of the tire may be used.

We claim:

1. An apparatus for contactless measurement of the internal temperature of a vehicle tire consisting of rubber-type material and having a surface, comprising: a vehicle tire supporting structure mounted in a vehicle; a vehicle tire is aforesaid rotatively mounted on the structure and having an internal temperature; a microwave receiver mounted on the vehicle and sensitive to electromagnetic radiation in a waveband in the frequency spectrum 10 to 100 GHz and operative for generating a temperature signal indicative of the internal temperature within a predetermined volume deep within the vehicle tire; and a directional antenna mounted on the vehicle in proximity to the tire and having its output coupled to the receiver input and whose aperture and orientation relative to the vehicle tire are such that the antenna is responsive to radiation in the aforesaid waveband emanating substantially from said volume of the vehicle tire and leaving the vehicle tire through the surface of the vehicle tire.

2. An apparatus according to claim 1 wherein the antenna is oriented to the normal to the tire surface at the Brewster angle of the material of the tire.

3. An apparatus according to claim 1 wherein a shield is provided to prevent microwave energy, which would otherwise be reflected at the tire surface to the antenna, from impinging on the tire surface.

4. An apparatus according to claim 1 including an isolator between the antenna and the receiver to prevent radiation from the antenna of microwave energy originating in the receiver.

5. An apparatus according to claim 1 including an indicator unit responsive to the output of the receiver to provide a visual or audible indication of the internal tire temperature.

6. An apparatus according to claim 5 wherein said indicator unit includes means for estimating the temperature/depth profile within the tire, thereby to relate the receiver output to the temperature at a predetermined depth within the tire.

7. An apparatus according to claim 6 wherein said estimating means includes means for sensing the temperature of the surface of the tire.

8. An apparatus according to claim 6 wherein said estimating means includes means for determining the cooling effect of local air at the surface of the tire.

9. An apparatus according to claim 1 wherein said receiver includes: a controllable calibration microwave energy source; amplifying and detecting means; means for applying the output of the antenna and the source alternately to the input of said amplifying means; means for controlling the output of said source in dependence on the difference between the outputs of said source and said antenna, thereby to reduce said difference substantially to zero; and means responsive to the output of said source to derive said output representative of the temperature of the tire.

10. A vehicle tire-safety monitoring apparatus for contactless measurement of variable internal temperatures within a pneumatic tire which is constituted at least in part of poor thermally conducting rubber-type material at an outer tire-surface and which is subjected to heat build-up during operation of the vehicle on which the tire is mounted, said apparatus comprising:

a directional antenna supported on the vehicle in the circumambient region of the vehicle tire, and having an aperture directed to a predetermined volume deep within the vehicle tire, said antenna aperture being dimensioned to collect electromagnetic radiation emanating from said predetermined volume and exiting through outer surface of the vehicle tire, said radiation being in the frequency band of 10 to 100 GHz; and receiver means mounted on the vehicle, including a microwave receiver tuned to said frequency band and operatively connected to the antenna, for generating temperature signals indicative of the variable internal temperatures within said predetermined volume.

* * * * *